United States Patent
Ouyang et al.

(10) Patent No.: US 10,095,082 B2
(45) Date of Patent: Oct. 9, 2018

(54) TE OPTICAL SWITCH WITH HIGH EXTINCTION RATIO BASED ON SLAB PHOTONIC CRYSTALS

(71) Applicant: Zhengbiao Ouyang, Shenzhen (CN)

(72) Inventors: Zhengbiao Ouyang, Shenzhen (CN); Guohua Wen, Shenzhen (CN)

(73) Assignee: Zhengbiao Ouyang, Shenzhen, Guangdong Province (CN)

( * ) Notice: Subject to any disclaimer, the term of this patent is extended or adjusted under 35 U.S.C. 154(b) by 0 days.

(21) Appl. No.: 15/626,156

(22) Filed: Jun. 18, 2017

(65) Prior Publication Data
US 2017/0285440 A1    Oct. 5, 2017

Related U.S. Application Data

(63) Continuation of application No. PCT/CN2015/097055, filed on Dec. 10, 2015.

(30) Foreign Application Priority Data

Dec. 10, 2014 (CN) .......................... 2014 1 0759245

(51) Int. Cl.
*G02F 1/313* (2006.01)
*G02B 6/122* (2006.01)
*G02B 6/12* (2006.01)

(52) U.S. Cl.
CPC ........... *G02F 1/3133* (2013.01); *G02B 6/122* (2013.01); *G02B 6/1225* (2013.01);
(Continued)

(58) Field of Classification Search
CPC ...... G02F 1/3133; G02B 6/1225; G02B 6/122
See application file for complete search history.

(56) References Cited

U.S. PATENT DOCUMENTS 6,795,621 B2 * 9/2004 Tokushima ............ B82Y 20/00
                                                   385/129
6,853,760 B2 * 2/2005 Sekine ................... B82Y 20/00
                                                   385/14
(Continued)

FOREIGN PATENT DOCUMENTS

CN     101571657 A     11/2009
CN     104375267 A     2/2015
(Continued)

OTHER PUBLICATIONS

Ming-Chang M. Lee, Dooyoung Hah, Erwin K Lau, Hiroshi Toshiyoshi and Ming Wu, "MEMS-Actuated Photonic Crystal Switches", IEEE Photonics Technology Letters, Jan. 15, 2006, pp. 358-360, vol. 18, No. 2.

*Primary Examiner* — Ryan Lepisto
(74) *Attorney, Agent, or Firm* — Cheng-Ju Chiang

(57) ABSTRACT

The present invention discloses a TEOS with a high extinction ratio based on slab PhCs which comprises an upper slab PhC and a lower slab PhC connected as a whole; the upper slab PhC is a first square-lattice slab PhC, the unit cell of the first square-lattice slab PhC includes a high-refractive-index rotating-square pillar, three first flat dielectric pillars and a background dielectric, the first flat dielectric pillars include a high-refractive-index dielectric pipe and a low-refractive-index dielectric, or 1 to 3 high-refractive-index flat films, or a low-refractive-index dielectric; the lower slab PhC is a second square-lattice slab PhC with a complete bandgap, the unit cell of the second square-lattice slab PhC includes a high-refractive-index rotating-square pillar, three second flat dielectric pillars and a background dielectric is a low-refractive-index dielectric; and an normalized operating frequency of the TEOS is 0.4057 to 0.406.

18 Claims, 10 Drawing Sheets

(52) U.S. Cl.
CPC .............. *G02B 2006/12145* (2013.01); *G02F 2201/06* (2013.01); *G02F 2202/32* (2013.01); *G02F 2203/07* (2013.01)

(56) References Cited

U.S. PATENT DOCUMENTS

| | | | | |
|---|---|---|---|---|
| 6,873,777 | B2* | 3/2005 | Bourelle | G02B 6/12007 |
| | | | | 385/129 |
| 7,269,310 | B2* | 9/2007 | Suzuki | B82Y 20/00 |
| | | | | 385/129 |
| 7,373,059 | B2* | 5/2008 | Spillane | B82Y 10/00 |
| | | | | 250/216 |
| 7,421,179 | B1* | 9/2008 | Jiang | B82Y 20/00 |
| | | | | 385/129 |
| 7,440,658 | B2* | 10/2008 | Furuya | B82Y 20/00 |
| | | | | 385/39 |
| 7,529,437 | B2* | 5/2009 | Spillane | B82Y 10/00 |
| | | | | 385/14 |
| 7,783,139 | B2* | 8/2010 | Noda | B82Y 20/00 |
| | | | | 385/11 |
| 7,831,124 | B2* | 11/2010 | Kiyota | B82Y 20/00 |
| | | | | 257/79 |
| 8,571,373 | B2 | 10/2013 | Wang et al. | |
| 8,617,471 | B2* | 12/2013 | Chakravarty | B82Y 20/00 |
| | | | | 385/12 |
| 2004/0001683 | A1* | 1/2004 | Lau | B82Y 20/00 |
| | | | | 385/129 |
| 2004/0247009 | A1* | 12/2004 | Noda | H01S 5/105 |
| | | | | 372/99 |
| 2005/0100296 | A1* | 5/2005 | Zoorob | B82Y 20/00 |
| | | | | 385/129 |
| 2011/0002581 | A1* | 1/2011 | Tokushima | B82Y 20/00 |
| | | | | 385/14 |

FOREIGN PATENT DOCUMENTS

| | | |
|---|---|---|
| CN | 104459988 A | 3/2015 |
| CN | 104459989 A | 3/2015 |
| CN | 104459990 A | 3/2015 |
| CN | 104459991 A | 3/2015 |
| WO | 03/014010 A1 | 2/2003 |
| WO | 2016/091195 A1 | 6/2016 |

\* cited by examiner

TE OPTICAL SWITCH WITH HIGH EXTINCTION RATIO BASED ON SLAB PHOTONIC CRYSTALS

CROSS REFERENCE TO RELATED APPLICATIONS

This application is a Continuation of Application of No. PCT/CN2015/097055, filed on Dec. 10, 2015 and claims priority to Chinese Patent Application No. 201410759245.2, filed on Dec. 10, 2014. The entire contents of which are hereby incorporated by reference.

TECHNICAL FILED

The present disclosure is related to a broadband TEOS with a high EXR based on slab photonic crystals (PhCs) with absolute band gaps.

BACKGROUND

In recent years, with the advent of information age, the speed and amount of information required for communication technology increase dramatically. Optical communication technologies add wings to the information age, but the information processing of nodes and routes still needs electronic circuits at present, which restricts the development of communication technologies in terms of speed, capacity and power consumption. Adopting photonic integrated circuits to replace or partially replace electronic integrated circuits for communication routes certainly will become the future direction of development. A photonic crystal (PhC) is a structure material in which dielectric materials are arranged periodically in space, and is usually an artificial crystal including of two or more materials having different dielectric constants. The electromagnetic modes in an absolute photonic band gap (PBG) cannot exist completely, so as an electronic energy band is overlapped with the absolute band gap of PhCs, spontaneous radiation is suppressed. The PhC having the absolute band gap can control spontaneous radiation, thereby changing the interaction between the fields and materials, and further improving the performance of optical devices.

Tunable photonic band gaps (PBGS) may be applied to information communication, display and storage. For modulating band gaps at high speeds by using external driving sources, many solutions have been proposed, e.g., controlling magnetic permeability by using a ferromagnetic material, and changing dielectric constant by using a ferroelectric material.

Most of the existing optical switches are realized by using a nonlinear effect, which requires the use of high-power light for control, thus it will inevitably consume a large amount of energy. In the presence of large-scale integrated system and a large number of communication users, the consumption of energy will become enormous. At the same time, the degree of polarization will affect signal-to-noise ratio and transmission speed.

SUMMARY

The present disclosure is aimed at overcoming the defects of the prior art and providing a transverse electric optical switch (TEOS) with a high extinction ratio (EXR) based on slab photonic crystals (PhCs).

The technical solution proposal adopted by the disclosure to solve the technical problem is as follows:

A transverse electric optical switch (TEOS) with high extinction ratio (EXR) based on slab photonic crystals (PhCs) in the present disclosure includes an upper slab photonic crystal (PhC) and a lower slab PhC connected as a whole; the upper slab PhC is a first square-lattice slab PhC, a unit cell of the first square-lattice slab PhC includes a high-refractive-index first rotated-square pillar, three first flat dielectric pillars and a background dielectric, the three first flat dielectric pillars are arranged horizontally, the three first flat dielectric pillars make the upper slab PhC connected as a whole, and each of three first flat dielectric pillars includes a high-refractive-index dielectric pipe and a low-refractive-index dielectric in the pipe, or 1 to 3 high-refractive-index flat films; the lower slab PhC is a second square-lattice slab PhC with a complete band gap, a unit cell of the second square-lattice slab PhC includes a high-refractive-index second rotated-square pillar, three second flat dielectric pillars and a background dielectric; the three second flat dielectric pillars are arranged horizontally, the three second flat dielectric pillars make the lower slab PhC connected as a whole, and the three second flat dielectric pillars are high-refractive-index dielectric pillars; the background dielectric is a low-refractive-index dielectric; and the normalized operating frequency ($a/\lambda$) of the TEOS is 0.4057 to 0.406, 0.4267 to 0.4329, or 0.44 to 0.479, wherein a is one lattice constant of the first and second square-lattice slab PhCs, and $\lambda$ is a wavelength of incident wave.

A thickness of a pipe wall in each of three first dielectric pillar in the unit cell of the first square-lattice slab PhC is 0-0.009a, wherein a is the lattice constant of the first square-lattice slab PhC; and the width of the low-refractive-index dielectric in the pipe is the difference between the width of a single one of the three first flat dielectric pillars and the thickness of the pipe wall.

The single one of the three first flat dielectric pillars in the unit cell of the first square-lattice slab PhC is horizontally located at the center of the first rotated-square pillar, two remaining of the three first flat dielectric pillars are respectively parallel to the single one of the three first flat dielectric pillars located horizontally at the center of the first rotated-square pillar, and the distance between the two remaining of the three first flat dielectric pillars is 0.25a, wherein a is the lattice constant of the first square-lattice slab PhC.

The side length of the high-refractive-index first rotated-square pillars of the first square-lattice slab PhC is 0.545a to 0.564a, wherein a is the lattice constant of the first square-lattice slab PhC, the rotated angle of the first square-lattice slab PhC is 0 to 90 degrees, and the width of each of the three first flat dielectric pillars in the unit cell of the first square-lattice slab PhC is 0.029a to 0.034a.

The single one of the three second flat dielectric pillars in the unit cell of the second square-lattice slab PhC is a horizontally position at the center of the second rotated-square pillar, two remaining of the three second flat dielectric pillars are respectively parallel to the single one of the three second flat dielectric pillars horizontally at the center of the rotated-square pillar, and the distance between the two remaining of the three second flat dielectric pillars is 0.25a, wherein a is the lattice constant of the second square-lattice slab PhC.

The side length of the high-refractive-index second rotated-square pillars of the second square-lattice slab PhC is 0.545a to 0.564a, wherein a is the lattice constant of the second square-lattice slab PhC, the rotated angle of the second square-lattice slab PhC is 0 to 90 degrees, and the width of each of the three second flat dielectric pillars in the unit cell of the second square-lattice slab PhC is 0.029a to 0.034a.

The high-refractive-index dielectric is a different dielectric having a refractive index of more than 2.

The high-refractive-index dielectric is silicon, gallium arsenide, or titanium dioxide.

The low-refractive-index dielectric is a different dielectric having a refractive index of less than 1.5.

The low-refractive-index dielectric is vacuum, air, cryolite, silica, organic foam, or olive oil.

The TEOS has one state that the first square-lattice slab PhC is located in an optical channel (OCH) and the second square-lattice slab PhC is located outside the OCH, and another state that the second square-lattice slab PhC is located in the OCH and the first square-lattice slab PhC is located outside the OCH.

In the case that the normalized operating frequency (a/λ) range of the TEOS is 0.4057 to 0.406, wherein a is the lattice constant of the first and second square-lattice slab PhCs, A is a wavelength of incident wave, and the EXR is −14 dB to −15 dB; wherein the first square-lattice slab PhC is located in the OCH and the second square-lattice slab PhC is located outside the OCH, is an optically connected state; wherein the second slab square-lattice PhC is located in the OCH and the first square-lattice slab PhC is located outside the OCH, is an optically disconnected state.

In the case that the normalized operating frequency (a/λ) range of the TEOS is 0.4267 to 0.4329, wherein a is the lattice constant of the first and second square-lattice slab PhCs, A is a wavelength of incident wave, and the EXR is −32 dB to −35 dB; wherein the second square-lattice slab PhC is located in the OCH and the first square-lattice slab PhC is located outside the OCH, is an optically connected state; wherein the first square-lattice slab PhC is located in the OCH and the second square-lattice slab PhC is located outside the OCH, is an optically disconnected state.

In the case that the normalized operating frequency (a/λ) range of the TEOS is 0.44 to 0.479, wherein a is the lattice constant of the first and second square-lattice slab PhCs, A is a wavelength of incident wave, and the EXR is −20 dB to −40 dB; wherein the second square-lattice slab PhC is located in the OCH and the first square-lattice slab PhC is located outside the OCH, is an optically connected state; wherein the first square-lattice slab PhC is located in the OCH and the second square-lattice slab PhC is located outside the OCH, is an optically disconnected state.

The positions of the first and the second square-lattice slab PhC in the optical channels (OCHs) are adjusted by external forces, including mechanical, electrical and magnetic forces.

In the case that the normalized operating frequency (a/λ) range of the TEOS is 0.4057 to 0.406, wherein a is the lattice constant of the first and second square-lattice slab PhCs, A is a wavelength of incident wave, and the EXR is −14 dB to −15 dB; wherein the first square-lattice slab PhC is located in the OCH and the second square-lattice slab PhC is located outside the OCH, is an optically connected state; wherein the second square-lattice slab PhC is located in the OCH and the first square-lattice slab PhC is located outside the OCH, is an optically disconnected state.

In the case that the normalized operating frequency (a/λ) range of the TEOS is 0.4267 to 0.4329, wherein a is the lattice constant of the first and second square-lattice slab PhCs, A is a wavelength of incident wave, and the EXR is −32 dB to −35 dB; wherein the second square-lattice slab PhC is located in the OCH and the first square-lattice slab PhC is located outside the OCH, is an optically connected state; wherein the first square-lattice slab PhC is located in the OCH and the second square-lattice slab PhC is located outside the OCH, is an optically disconnected state.

In the case that the normalized operating frequency (a/λ) range of the TEOS is 0.44 to 0.479, wherein a is the lattice constant of the first and second square-lattice slab PhCs, A is a wavelength of incident wave, and the EXR is −20 dB to −40 dB; wherein the second square-lattice slab PhC is located in the OCH and the first square-lattice slab PhC is located outside the OCH, is an optically connected state; wherein the first square-lattice slab PhC is located in the OCH and the second square-lattice slab PhC is located outside the OCH, is an optically disconnected state.

Compared with the prior art, the present disclosure has the following positive effects.

1. The transverse electric optical switch (TEOS) is an indispensable component in an integrated optical circuit and is very important for high-speed operation of a network, and large bandwidth, low energy loss, high polarization degree and high extinction ratio (EXR) are important parameters for evaluating switches.

2. The functions of the TEOS are realized by adjusting the positions of the first square-lattice slab photonic crystal (PhC) (the upper slab PhC) and the second square-lattice slab PhC (the lower slab PhC) in the optical channel (OCH).

3. The structure of the present disclosure enables a TEOS with a high EXR.

4. The TEOS with a high EXR based on slab photonic crystals (PhCs) facilitates optical integration.

These and other objects and advantages of the present disclosure will become readily apparent to those skilled in the art upon reading the following detailed description and claims and by referring to the accompanying drawings.

BRIEF DESCRIPTION OF THE DRAWINGS

FIG. 7 is an optical field (electric field) distribution diagram of the TEOS for the normalized operating frequency (a/λ) of 0.4057 as shown in some embodiments 3, wherein the wave is incident from top, the left-hand-side plot shows the OFF state that the wave cannot go through, and the right-hand-side plot shows the ON state that the wave may go through.

FIG. 8 is an optical field (electric field) distribution diagram of the TEOS for the normalized operating frequency (a/λ) of 0.4058 as shown in some embodiments 4, wherein the wave is incident from top, the left-hand-side plot shows the OFF state that the wave cannot go through, and the right-hand-side plot shows the ON state that the wave may go through.

FIG. 9 is an optical field (electric field) distribution diagram of the TEOS for the normalized operating frequency (a/λ) of 0.406 as shown in some embodiments 5, wherein the wave is incident from top, the left-hand-side plot shows the OFF state that the wave cannot go through, and the right-hand-side plot shows the ON state that the wave may go through.

FIG. 10 is an optical field (electric field) distribution diagram of the TEOS for the normalized operating frequency (a/λ) of 0.4267 as shown in some embodiments 6, wherein the wave is incident from top, the left-hand-side plot shows the OFF state that the wave cannot go through, and the right-hand-side plot shows the ON state that the wave may go through.

FIG. 11 is an optical field (electric field) distribution diagram of the TEOS for the normalized operating frequency (a/λ) of 0.4315 as shown in some embodiments 7, wherein the wave is incident from top, the left-hand-side plot shows the ON state that the wave cannot go through, and the right-hand-side plot shows the OFF state that the wave may go through.

FIG. 12 is an optical field (electric field) distribution diagram of the TEOS for the normalized operating frequency (a/λ) of 0.4329 as shown in some embodiments 8, wherein the wave is incident from top, the left-hand-side plot shows the OFF state that the wave cannot go through, and the right-hand-side plot shows the ON state that the wave may go through.

FIG. 13 is an optical field (electric field) distribution diagram of the TEOS for the normalized operating frequency (a/λ) of 0.44 as shown in some embodiments 9, wherein the wave is incident from top, the left-hand-side plot shows the OFF state that the wave cannot go through, and the right-hand-side plot shows the ON state that the wave may go through.

FIG. 14 is an optical field (electric field) distribution diagram of the TEOS for the normalized operating frequency (a/λ) of 0.4435 as shown in some embodiments 10, wherein the wave is incident from top, the left-hand-side plot shows the ON state that the wave cannot go through, and the right-hand-side plot shows the OFF state that the wave may go through.

FIG. 15 is an optical field (electric field) distribution diagram of the TEOS for the normalized operating frequency (a/λ) of 0.452 as shown in some embodiments 11, wherein the wave is incident from top, the left-hand-side plot shows the OFF state that the wave cannot go through, and the right-hand-side plot shows the ON state that the wave may go through.

FIG. 16 is an optical field (electric field) distribution diagram of the TEOS for the normalized operating frequency (a/λ) of 0.456 as shown in some embodiments 12, wherein the wave is incident from top, the left-hand-side plot shows the ON state that the wave cannot go through, and the right-hand-side plot shows the OFF state that the wave may go through.

FIG. 17 is an optical field (electric field) distribution diagram of the TEOS for the normalized operating frequency (a/λ) of 0.479 as shown in some embodiments 13, wherein the wave is incident from top, the left-hand-side plot shows the ON state that the wave cannot go through, and the right-hand-side plot shows the OFF state that the wave may go through.

The present disclosure is more specifically described in the following paragraphs by reference to the drawings attached only by way of example.

DETAILED DESCRIPTION OF DISCLOSED EMBODIMENTS

The terms a or an, as used herein, are defined as one or more than one. The term plurality, as used herein, is defined as two or more than two. The term another, as used herein, is defined as at least a second or more.

The present disclosure will be further described in detail below in combination with the accompanying drawings and specific embodiments.

Figure 1A:
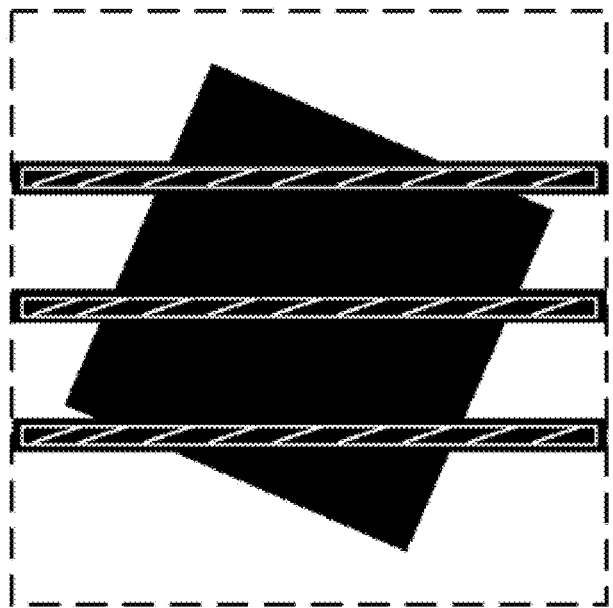
FIG. 1A is a structural schematic diagram of a unit cell of an upper slab photonic crystal (PhC) of a transverse electric optical switch (TEOS) of the present disclosure.
Figure 1B:
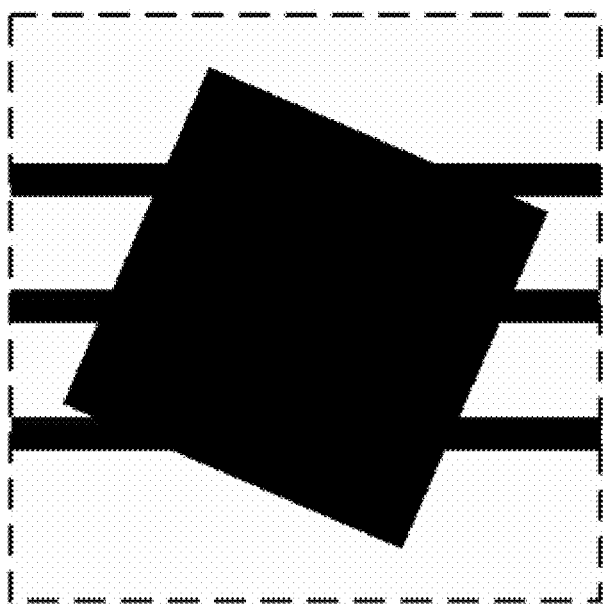
FIG. 1B is a structural schematic diagram of a unit cell of a lower slab PhC of the TEOS of the present disclosure.

A transverse electric optical switch (TEOS) with a high extinction ratio (EXR) based on slab photonic crystals (PhCs) in the present disclosure, as shown in FIG. 1A, includes an upper slab photonic crystal (PhC) and a lower slab PhC connected as a whole; the upper slab PhC is a first square-lattice slab PhC, the unit cell of the first square-lattice slab PhC includes a high-refractive-index first rotated-square pillar 012, the three first flat dielectric pillars 011 and a background dielectric, the three first flat dielectric pillars 011 are arranged horizontally, the three first flat dielectric pillars 011 make the upper slab PhC connected as a whole, and each of the first flat dielectric pillars 011 includes a high-refractive-index dielectric pipe and a low-refractive-index dielectric in the pipe, or 1 to 3 of a high-refractive-index flat films; as shown in FIG. 1B, the lower slab PhC is a second square-lattice slab PhC with a complete band gap, the unit cell of the second square-lattice slab PhC includes a high-refractive-index second rotated-square pillar 012, three second flat dielectric pillars 021 and a background dielectric, the three second flat dielectric pillars 021 are arranged horizontally, the three second flat dielectric pillars 021 make the lower slab PhC connected as a whole, the three second flat dielectric pillars 021 are high-refractive-index dielectric pillars, and the high-refractive-index dielectric is silicon, gallium arsenide, or titanium dioxide, and the high-refractive-index dielectric is the different dielectric having a refractive index of more than 2, the background dielectric is the low-refractive-index dielectric, and the low-refractive-index dielectric is vacuum, air, cryolite, silica, organic foam, or olive oil, and the low-refractive-index dielectric is the different dielectric having a refractive index of less than 1.5.

The normalized operating frequency (a/λ) of the TEOS with a high EXR is 0.4057 to 0.406, 0.4267 to 0.4392 or 0.44 to 0.479, wherein a is the lattice constant of the first and second square-lattice slab PhCs, Λ is the wavelength of incident wave, and the frequency range is either the transverse electric (TE) transmission band of the first slab PhC and the band gap of the second square-lattice slab PhC, or the second square-lattice slab PhC and the TE transmission band and TE band gap of the first square-lattice slab PhC, wherein a is the lattice constant of the first and second square-lattice slab PhCs, and Λ is the wavelength of incident wave.

For the normalized operating frequency (a/λ) of the TEOS with a high EXR being 0.4057 to 0.406, wherein a is the lattice constant of the first and second square-lattice slab PhCs, Λ is the wavelength of incident wave, and the EXR is −14 dB to −15 dB, a state in which the first square-lattice slab PhC is located in the optical channel (OCH) and the second square-lattice slab PhC is located outside the OCH, is a first switch state of the TEOS (i.e., optically connected state); another state in which the second slab PhC is located in the OCH and the first square-lattice slab PhC is located outside the OCH, is a second switch state of the TEOS (i.e., optically disconnected state); and wherein the first slab lattice PhC is located in the OCH and the second square-lattice slab PhC is located outside the OCH, is an optically connected state; wherein the second square-lattice slab PhC is located in the OCH and the first square-lattice slab PhC is located outside the OCH, is an optically disconnected state.

For the normalized operating frequency (a/λ) of the TEOS being 0.4267 to 0.4329, wherein a is the lattice constant of the first and second square-lattice slab PhCs, A is the wavelength of incident wave, and the EXR is −32 dB to −35 dB; wherein the second square-lattice slab PhC is located in the OCH and the first square-lattice slab PhC is located outside the OCH, is an optically connected state; wherein the first square-lattice slab PhC is located in the OCH and the second square-lattice slab PhC is located outside the OCH, is an optically disconnected state.

For the normalized operating frequency (a/λ) of the high EXR TEOS being 0.44 to 0.479, wherein a is the lattice constant of the first and second square-lattice slab PhCs, A is the wavelength of incident wave, and the EXR is −20 dB to −40 dB; wherein the second square-lattice slab PhC is located in the OCH and the first square-lattice slab PhC is located outside the OCH, is an optically connected state; wherein the first square-lattice slab PhC is located in the OCH and the second square-lattice slab PhC is located outside the OCH, is an optically disconnected state.

The EXR of the TEOS is a ratio of the output optical powers of the switch in the two states.

The first implementation of the TEOS with a high EXR based on slab PhCs of the present disclosure.

Figure 2A:
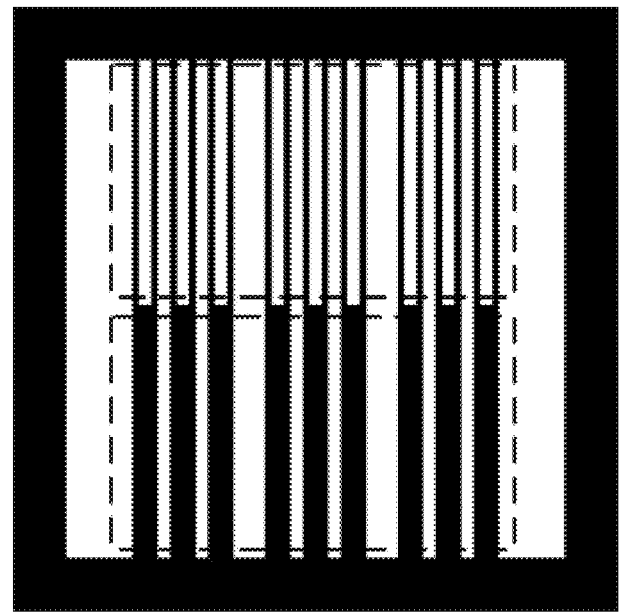
FIG. 2A is a structural schematic diagram of a first implementation of the TEOS with a high extinction ratio (EXR) based on slab photonic crystals (PhCs) of the present disclosure.

The TEOS with a high EXR includes an upper slab PhC and a lower slab PhC connected as a whole; as shown in FIG. 2A, the high-refractive-index first and second rotated-square pillars in the PhC are omitted in the figure, and the dashed box shows the position of the high-refractive-index first and second rotated-square pillars array; the upper slab PhC is a first square-lattice slab PhC, the unit cell of the first square-lattice slab PhC includes a high-refractive-index first rotated-square pillar, the three first flat dielectric pillars 011 and a background dielectric, the side length of the high-refractive-index first rotated-square pillar 011 of the first square-lattice slab PhC is 0.545a to 0.564a, wherein a is the lattice constant of the first square-lattice slab PhC, the rotated angle of the first square-lattice slab PhC is 0 to 90 degrees, and the width of the each of the three first flat dielectric pillars 011 in the unit cell of the first square-lattice slab PhC is 0.029a to 0.034a; the three first flat dielectric pillars 011 are arranged horizontally, the single one of the three first flat dielectric pillars 011 in the unit cell of the first square-lattice slab PhC is horizontally located at the center of the first rotated-square pillar, two remaining of the three first flat dielectric pillars 011 are respectively parallel to the single one of the three first flat dielectric pillars 011 located horizontally at the center of the first rotated-square pillar, and the distance between two remaining of the three first flat dielectric pillars 011 is 0.25a. The three first flat dielectric pillars 011 make the upper slab PhC connected as a whole, the each of the three first flat dielectric pillars 011 includes a high-refractive-index pipe and a low-refractive-index dielectric in the pipe, the thickness of the pipe wall in each of the three first flat dielectric pillar 011 in the unit cell of the first square-lattice slab PhC is 0 to 0.009a; and the width of the low-refractive-index dielectric in the pipe is the difference between the width of the single one of the first flat dielectric pillars 011 and the thickness of the pipe wall. The lower slab PhC is the second square-lattice slab PhC with a complete band gap, the unit cell of the second square-lattice slab PhC includes a high-refractive-index second rotated-square pillar, the three second flat dielectric pillars 021 and a background dielectric, the side length of the high-refractive-index second rotated-square pillars of the second square-lattice slab PhC is 0.545a to 0.564a, wherein a is the lattice constant of the second square-lattice slab PhC, the rotated angle of the second square-lattice slab PhC is 0 to 90 degrees, and the width of each of the three second flat dielectric pillars 021 in the unit cell of the second square-lattice slab PhC is 0.029a to 0.034a; the three second flat dielectric pillars 021 are arranged horizontally, and the three second flat dielectric pillars 021 make the lower slab PhC connected as a whole, the single one of the three second flat dielectric pillars 021 in the unit cell of the second square-lattice slab PhC is horizontally located at the center of the second rotated-square pillar, two remaining of the three second flat dielectric pillars 021 are respectively parallel to the single of the three second flat dielectric pillar 021 located horizontally at the center of the second rotated-square pillar, and the distance between two remaining of the three second flat dielectric pillars 021 is 0.25a; the three second flat dielectric pillars 021 are high-refractive-index dielectric pillars, the high-refractive-index dielectric is silicon, gallium arsenide, or titanium dioxide, and the high-refractive-index is the different dielectric having a refractive index of more than 2, and the high-refractive-index dielectric adopts a silicon material; the background dielectric is a low-refractive-index dielectric, and the low-refractive-index dielectric is vacuum, air, cryolite, silica, organic foam, or olive oil, and low-refractive-index dielectric is the different dielectric having a refractive index of less than 1.5. The normalized operating frequency (a/λ) range of the TEOS with a high EXR is 0.4057 to 0.406, and the frequency range is either the TE transmission band of the first square-lattice slab PhC and the TE band gap of the second square-lattice slab PhC, or the second square-lattice slab PhC and the TE transmission band and TE band gap of the first square-lattice slab PhC, wherein a is the lattice constant of the first and second square-lattice slab PhCs, and A is the wavelength of incident wave.

The second implementation of the TEOS with a high EXR based on slab PhCs of the present disclosure.

Figure 2B:
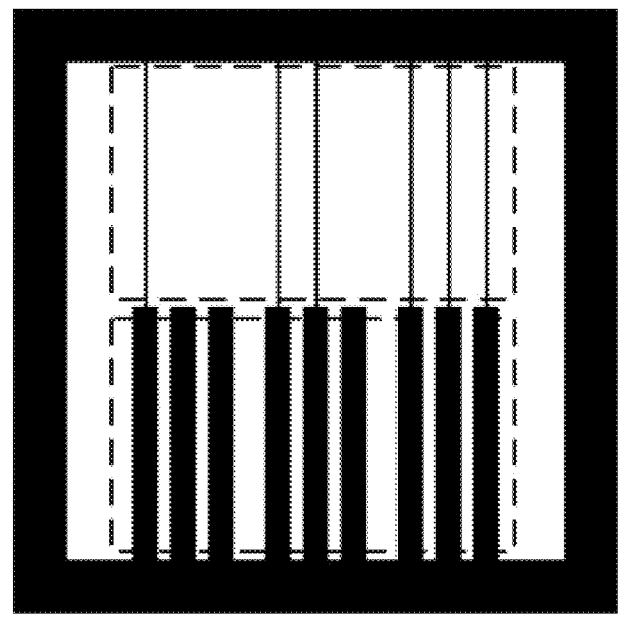
FIG. 2B is a structural schematic diagram of a second implementation of the TEOS with a high EXR based on slab PhCs of the present disclosure.

The TEOS includes an upper slab PhC and a lower slab PhC connected as a whole; as shown in FIG. 2B, the high-refractive-index first and second rotated-square pillars are omitted in the figure, and the dashed box shows the position of the high-refractive-index first and second rotated-square pillars array; the upper slab PhC is a first square-lattice slab PhC, the unit cell of the first square-lattice slab PhC includes a high-refractive-index first rotated-square pillar, the three first flat dielectric pillars 013 and a background dielectric, the side length of the high-refractive-index first rotated-square pillars of the first square-lattice slab PhC is 0.545a to 0.564a, wherein a is the lattice constant of the first square-lattice slab PhC, the rotated angle of the first square-lattice slab PhC is 0 to 90 degrees, and the width of the each of the three first flat dielectric pillar 013 in the unit cell of the first square-lattice slab PhC is 0.029a to 0.034a, the three first flat dielectric pillars 013 are arranged horizontally, the single one of the three first flat dielectric pillars 013 in the unit cell of the first square-lattice slab PhC is horizontally located at the center of the first rotated-square pillar, two remaining of the three first flat dielectric pillars 013 are respectively parallel to the single one of the three first flat dielectric pillars 013 located horizontally at the center of the first rotated-square pillar, and the distance between the two remaining of the three first flat dielectric pillars 013 is 0.25a; the three first flat dielectric pillars 013 make the upper slab PhC connected as a whole, and each of the three first flat dielectric pillars 013 includes 1 to 3 high-refractive-index flat films. The lower slab PhC is the second square-lattice slab PhC with a complete band gap, the unit cell of the second square-lattice slab PhC includes a high-refractive-index second rotated-square pillar, the three second flat dielectric pillars 021 and a background dielectric, the three second flat dielectric pillars 021 are arranged horizontally, the three second flat dielectric pillars 021 make the lower slab PhC connected as a whole, the single one of the three second flat dielectric pillars 021 in the unit cell of the second square-lattice slab PhC is horizontally located at the center of the second rotated-square pillar, two remaining of the three second flat dielectric pillars 021 are respectively parallel to the single one of the three second flat dielectric pillars 021 located horizontally at the center of the second rotated-square pillar, and the distance between the two remaining of the three second flat dielectric pillars 021 is 0.25a, wherein a is the lattice constant of the second square-lattice slab PhC; the side length of the high-refractive-index second rotated-square pillars of the second square-lattice slab PhC is 0.545a to 0.564a, the rotated angle of the second square-lattice slab PhC is 0 to 90 degrees, and the width of each of the three second flat dielectric pillars 021 in the unit cell of the second square-lattice slab PhC is 0.029a to 0.034a. The three second flat dielectric pillars 021 are high-refractive-index dielectric pillars, the high-refractive-index dielectric is silicon, gallium arsenide, or titanium dioxide, and the high-refractive-index dielectric is the different dielectric having a refractive index of more than 2, and the high-refractive-index dielectric adopts a silicon material; the background dielectric is a low-refractive-index dielectric, and the low-refractive-index dielectric is vacuum, air, cryolite, silica, organic foam, or olive oil, and the low-refractive-index dielectric is the different dielectric having a refractive index of less than 1.5. The normalized operating frequency (a/λ) range of the TEOS with a high EXR is 0.4267 to 0.4329, and the frequency range is either the TE transmission band of the first square-lattice slab PhC and the TE band gap of the second square-lattice slab PhC, or the second square-lattice slab PhC and the TE transmission band and TE band gap of the first square-lattice slab PhC, wherein a is the lattice constant of the first and second square-lattice slab PhCs, and Λ is the wavelength of incident wave.

The third implementation of the TEOS with a high EXR based on slab PhCs of the present disclosure.

Figure 2C:
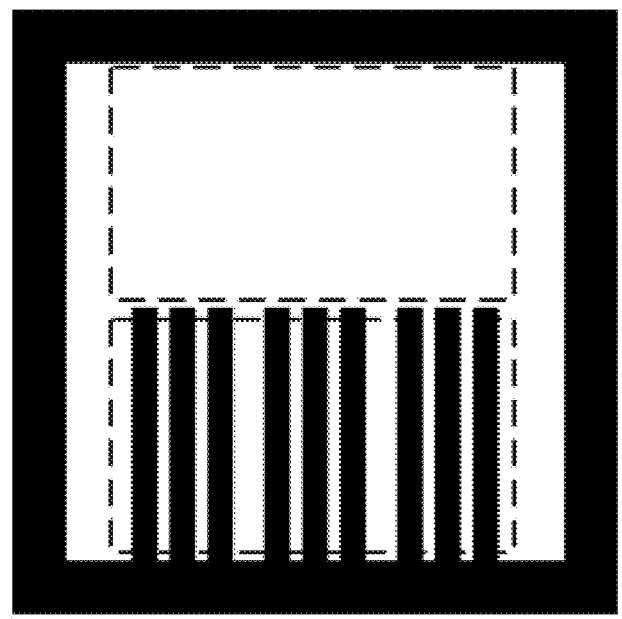
FIG. 2C is a structural schematic diagram of a third implementation of the TEOS with a high EXR based on slab PhCs of the present disclosure.

The TEOS includes an upper slab PhC and a lower slab PhC connected as a whole; as shown in FIG. 2C, high-refractive-index first and second rotated-square pillars in the PhC are omitted in the figure, and the dashed box shows the position of the high-refractive-index first and second rotated-square pillars array. The upper slab PhC is a first square-lattice slab PhC, the unit cell of the first square-lattice slab PhC includes a high-refractive-index first rotated-square pillar, and a background dielectric, the background dielectric is a low-refractive-index dielectric, and the low-refractive-index dielectric is vacuum, air, cryolite, silica, organic foam, or olive oil, and the low-refractive-index dielectric is the different dielectric having a refractive index of less than 1.5 (e.g., air). The lower slab PhC is a second square-lattice slab PhC with a complete band gap, the unit cell of the second square-lattice slab PhC includes a high-refractive-index second rotated-square pillar, the three second flat dielectric pillars 021 and a background dielectric, the three second flat dielectric pillars 021 are arranged horizontally, the three second flat dielectric pillars 021 make the lower slab PhC connected as a whole; the single one of the three second flat dielectric pillars 021 in the unit cell of the second square-lattice slab PhC is horizontally located at the center of the second rotated-square pillar, two remaining of the three second flat dielectric pillars 021 are respectively parallel to the single one of the three second flat dielectric pillars 021 located horizontally at the center of the second rotated-square pillar, and the distance between the two remaining of the three second flat dielectric pillars 021 is 0.25a, wherein a is the lattice constant of the second square-lattice slab PhC; the side length of the high-refractive-index second rotated-square pillars of the second square-lattice slab PhC is 0.545a to 0.564a, the rotated angle of the second square-lattice slab PhC is 0 to 90 degrees, and the width of each of the three second flat dielectric pillars 021 in the unit cell of the second square-lattice slab PhC is 0.029a to 0.034a, the three second flat dielectric pillars 021 are high-refractive-index dielectric pillars, the high-refractive-index dielectric is silicon, gallium arsenide, or titanium dioxide, and the high-refractive-index dielectric is the different dielectric having a refractive index of more than 2, and the high-refractive-index dielectric adopts a silicon material; the background dielectric is a low-refractive-index dielectric; The normalized operating frequency (a/λ) range of the TEOS with a high EXR is 0.44a to 0.479a, and the frequency range is either the TE transmission band of the first square-lattice slab PhC and the TE band gap of the second square-lattice slab PhC, or the second square-lattice slab PhC and the TE transmission band and TE band gap of the first square-lattice slab PhC, wherein a is the lattice constant of the first and second square-lattice slab PhCs, and Λ is the wavelength of incident wave.

The fore three implementations all take a paper surface as the reference plane, and the upper and lower slab PhCs are connected as a whole by a frame and move vertically under the action of external forces to realize the functions of the TEOS, as shown in FIGS. 2A-2C, the high-refractive-index first and second rotated-square pillars in the PhC are omitted in the figure, and the dashed box shows the position the high-refractive-index first and second rotated-square pillars array. Because the frame itself is not on the light input and output planes, i.e., the light input and output planes are parallel to the reference plane, the propagation of light is not influenced. The vertical movement of the upper and lower slab PhCs serving as a whole may be realized by micromechanical, electrical or magnetic forces. For example, a magnet may be embedded into the frame, a pressure linkage device is connected with the frame, the pressure may thus drive the black frame to move up and down, and the left and right sides of the frame are located in a groove guide rail to guarantee that the black frame moves vertically, linearly and reciprocally.

Figure 3:
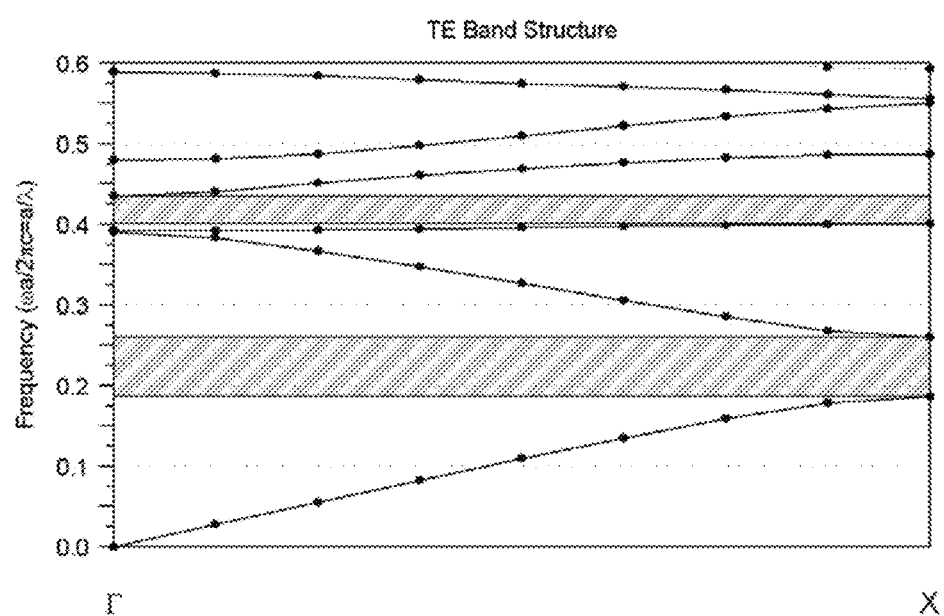
FIG. 3 is a photonic band map of the second square-lattice slab PhC shown in some embodiments 1.
Figure 4:
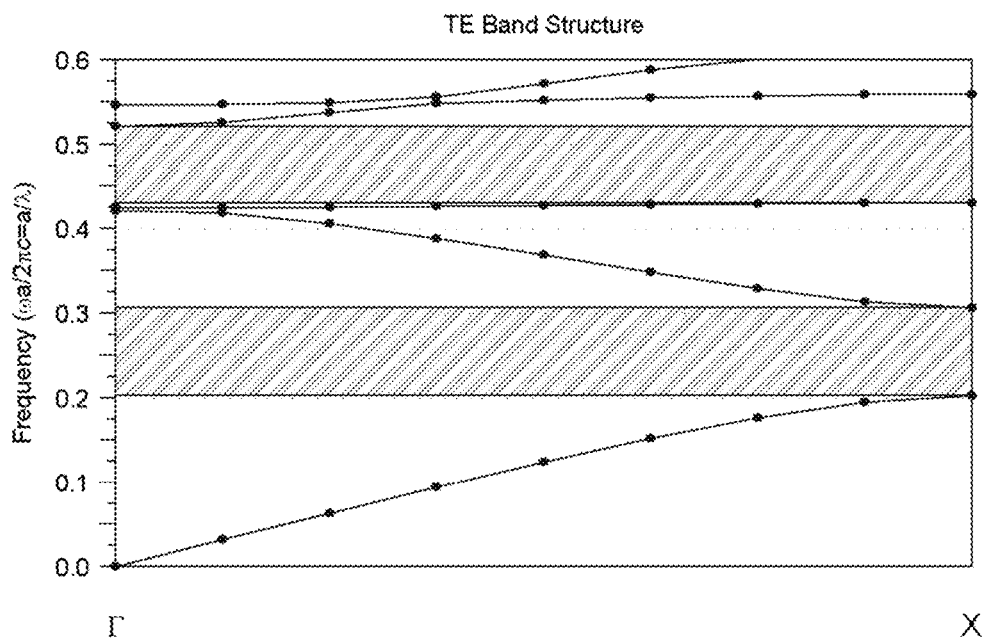
FIG. 4 is a photonic band map of the first square-lattice slab PhC shown in some embodiments 1.

At least embodiments 1, different photonic band maps in a horizontal direction are obtained through the first and second square-lattice slab PhCs, FIG. 3 is a photonic band map of the second square-lattice slab PhC, the TE band gap normalization frequency (a/λ) is 0.400 to 0.4325; FIG. 4 is a photonic band map of the first square-lattice slab PhC, the TE band gap normalization frequency (a/λ) is 0.4303 to 0.5216, and it may be known by comparison that for the normalized operating frequency (a/λ) range of 0.400 to 0.4303, this structure enables a TEOS with a high EXR.

Figure 5:
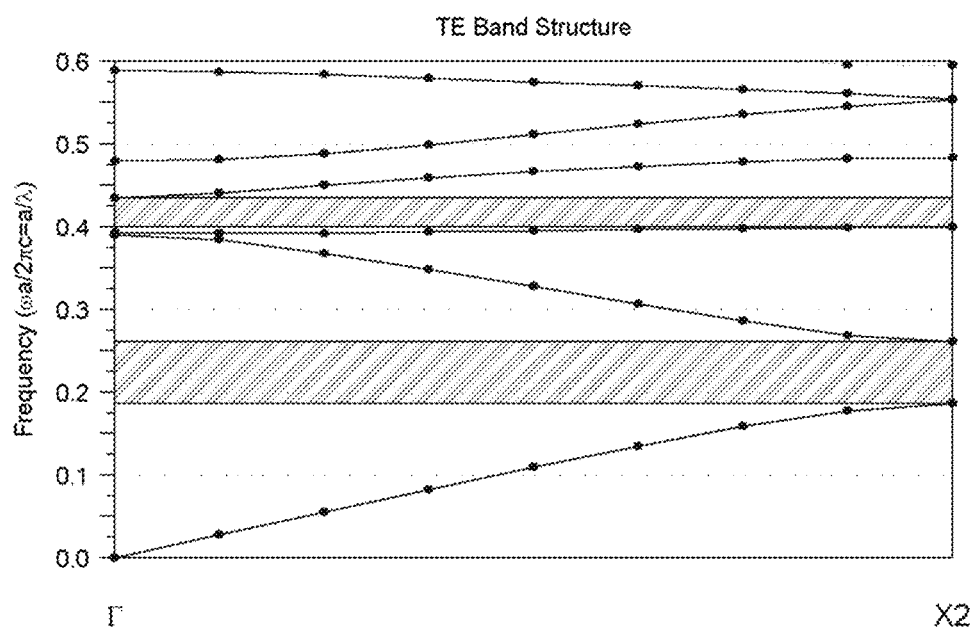
FIG. 5 is a photonic band map of the second square-lattice slab PhC shown in embodiments 2.
Figure 6:
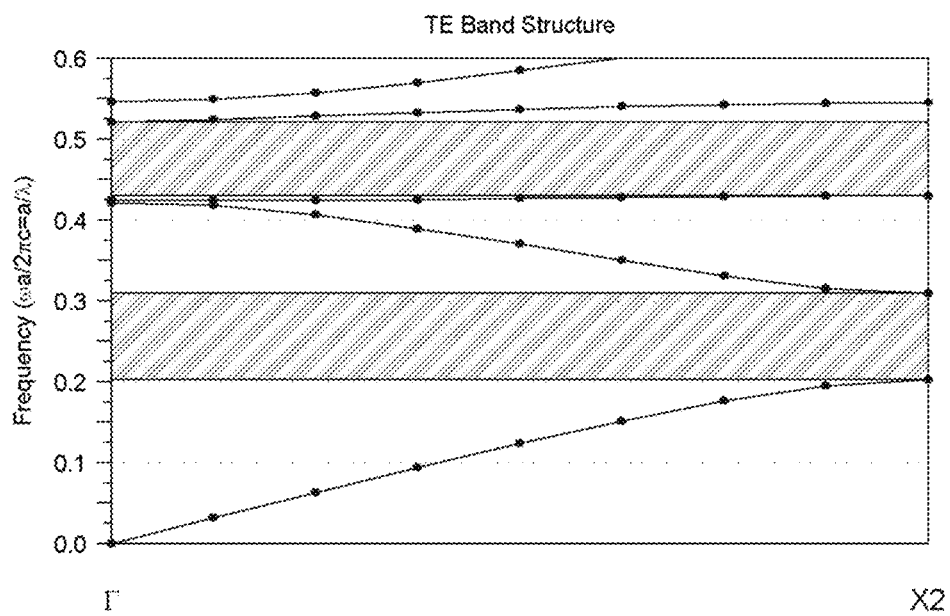
FIG. 6 is a photonic band map of the first square-lattice slab PhC shown in some embodiments 2.

At least embodiments 2, different photonic band maps in a vertical direction are obtained through the first and second square-lattice slab PhCs, FIG. 5 is a photonic band map of the second square-lattice slab PhC, the TE band gap normalization frequency (a/λ) is 0.400 to 0.4325; FIG. 6 is a photonic band of the first square-lattice slab PhC, the TE band gap normalization frequency (a/λ) is 0.4303 to 0.5216, and it may be known by comparison that for the normalized operating frequency (a/λ) range being 0.400 to 0.4303, the structure enables a TEOS with a high EXR.

Figure 7:
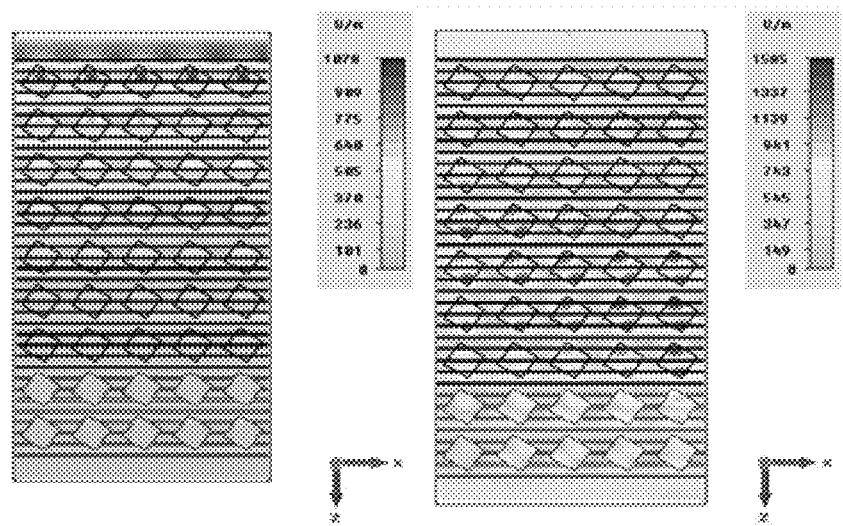

At least embodiments 3, the normalized operating frequency (a/λ) is 0.4057. By adopting the first implementation and verifying with three-dimensional (3D) structure parameters for nine layers of the high-refractive-index first and second rotated-square pillars and thirty-seven layers of high-refractive-index dielectric veins, the result is illustrated in FIG. 7. It may be known from FIG. 7 that: the TEOS has good extinction effect.

Figure 8:
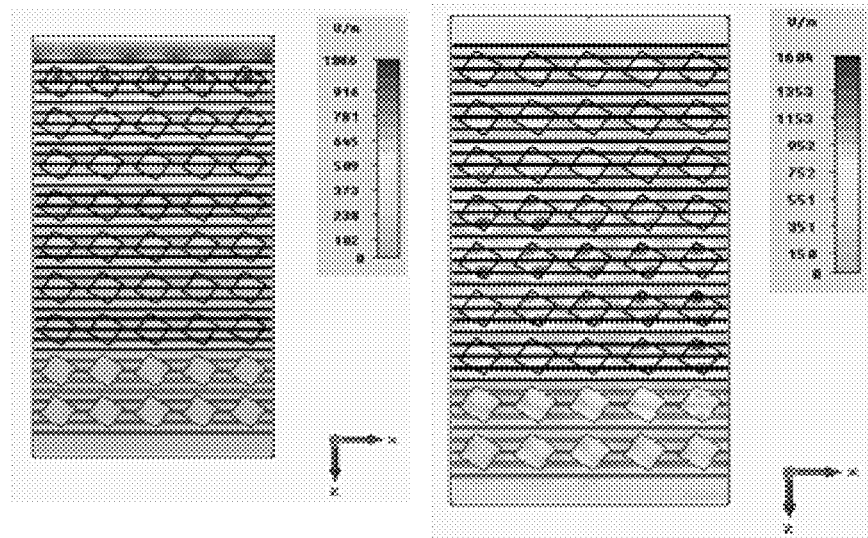

At least embodiments 4, the normalized operating frequency (a/λ) is 0.4058. By adopting the first implementation and verifying with 3D structure parameters for nine layers of high-refractive-index first and second rotated-square pillars and thirty-seven layers of high-refractive-index dielectric veins, the result is illustrated in FIG. 8. It may be known from FIG. 8 that: the TEOS has good extinction effect.

Figure 9:
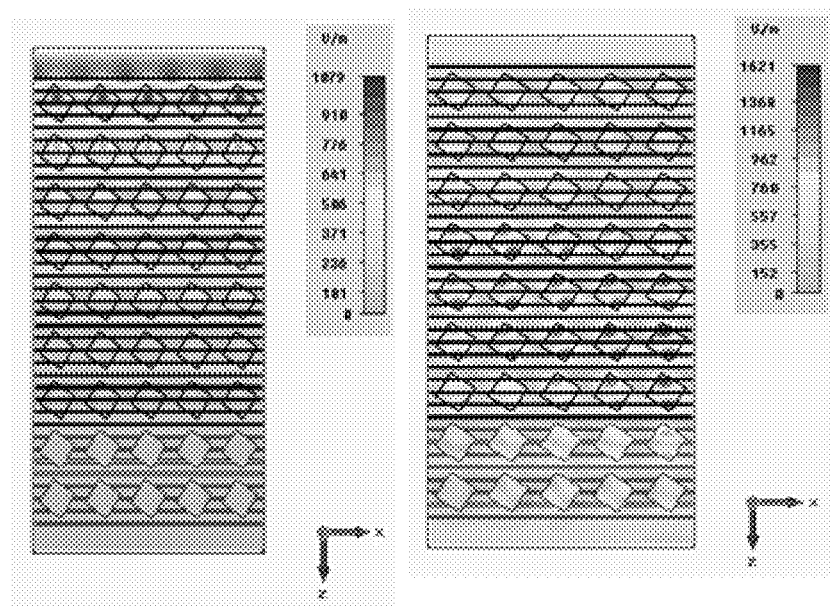

At least embodiments 5, the normalized operating frequency (a/λ) is 0.406. By adopting the first implementation and verifying with 3D structure parameters for nine layers of high-refractive-index first and second rotated-square pillars and thirty-seven layers of high-refractive-index dielectric veins, the result is illustrated in FIG. 9. It may be known from FIG. 9 that: the TEOS has good extinction effect.

Figure 10:
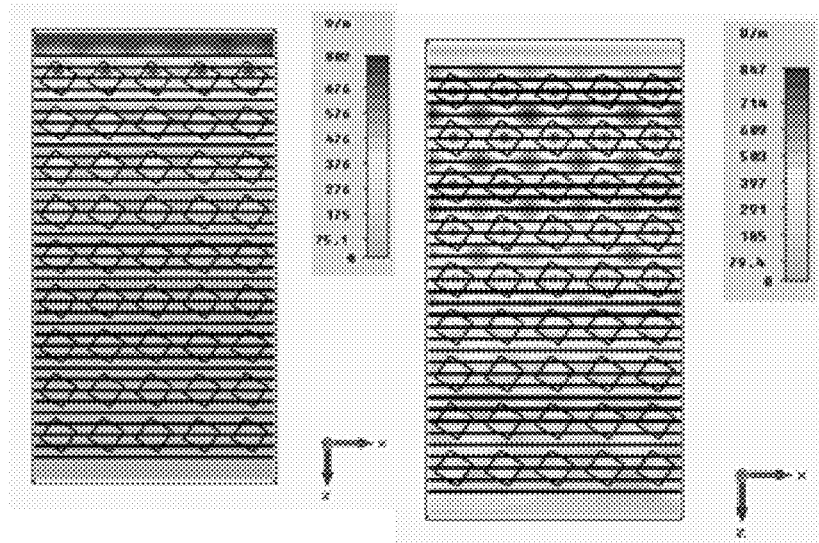

At least embodiments 6, the normalized operating frequency (a/λ) is 0.4267. By adopting the second implementation and verifying with 3D structure parameters for nine layers of high-refractive-index first and second rotated-square pillars and thirty-seven layers of high-refractive-index dielectric veins, the result is illustrated in FIG. 10. It may be known from FIG. 10 that: the TEOS has good extinction effect.

Figure 11:
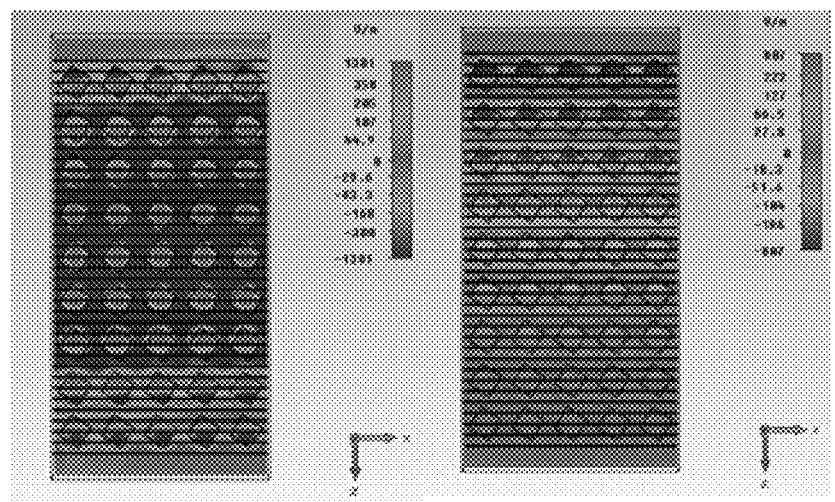

At least embodiments 7, the normalized operating frequency (a/λ) is 0.4315. By adopting the second implementation and verifying with 3D structure parameters for nine layers of high-refractive-index first and second rotated-square pillars and thirty-seven layers of high-refractive-index dielectric veins, the result is illustrated in FIG. 11. It may be known from FIG. 11 that: the TEOS has good extinction effect.

Figure 12:
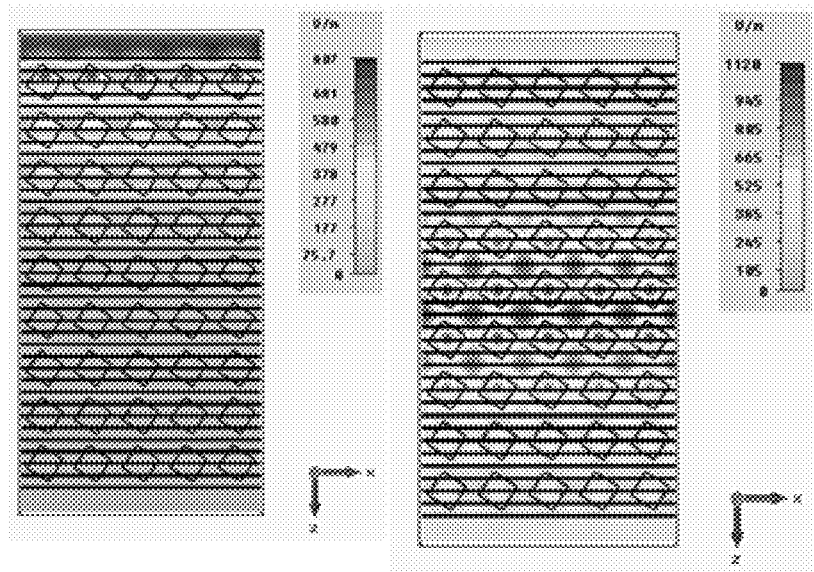

At least embodiments 8, the normalized operating frequency (a/λ) is 0.4329. By adopting the second implementation and verifying with 3D structure parameters for nine layers of high-refractive-index first and second rotated-square pillars and thirty-seven layers of high-refractive-index dielectric veins, the result is illustrated in FIG. 12. It may be known from FIG. 12 that: the TEOS has good extinction effect.

Figure 13:
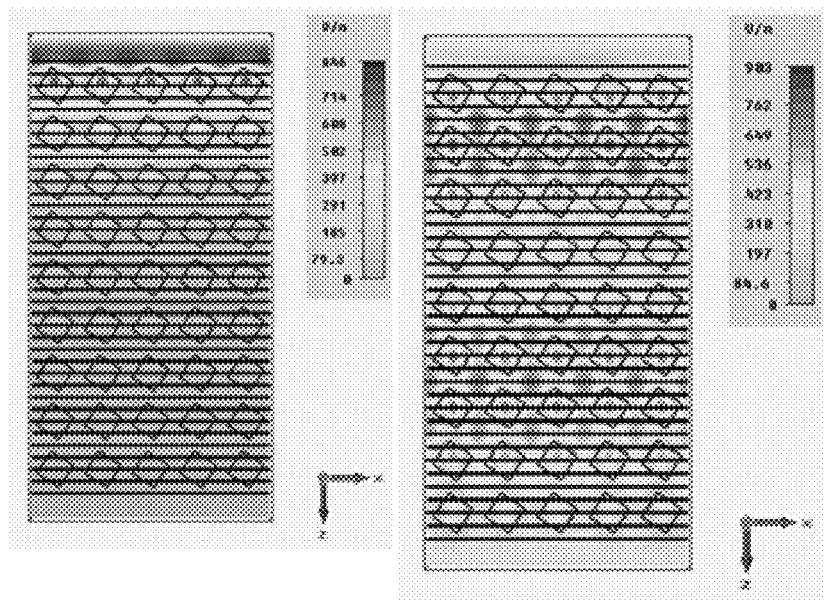

At least embodiments 9, the normalized operating frequency (a/λ) is 0.44. By adopting the three implementation and verifying with 3D structure parameters for nine layers of high-refractive-index first and second rotated-square pillars and thirty-seven layers of high-refractive-index dielectric veins, the result is illustrated in FIG. 13. It may be known from FIG. 13 that: the TEOS has good extinction effect.

Figure 14:
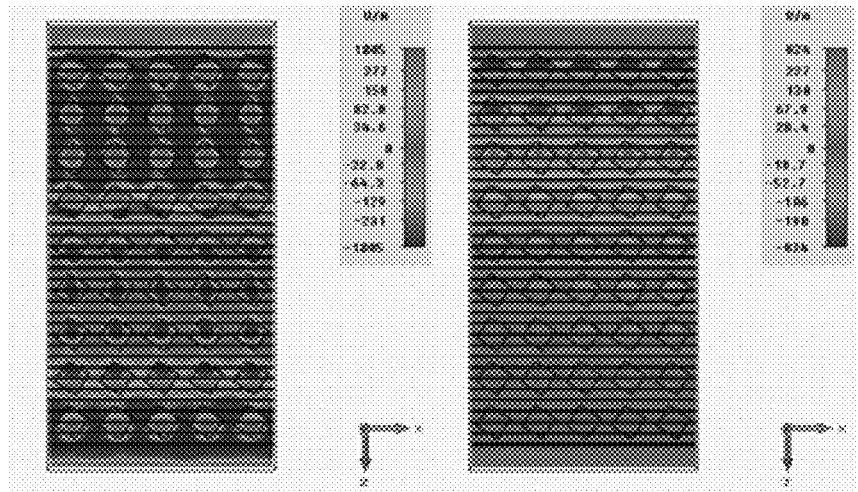

At least embodiments 10, the normalized operating frequency (a/λ) is 0.4435. By adopting the three implementation and verifying with 3D structure parameters for nine layers of high-refractive-index first and second rotated-square pillars and thirty-seven layers of high-refractive-index dielectric veins, the result is illustrated in FIG. 14. It may be known from FIG. 14 that: the TEOS has good extinction effect.

Figure 15:
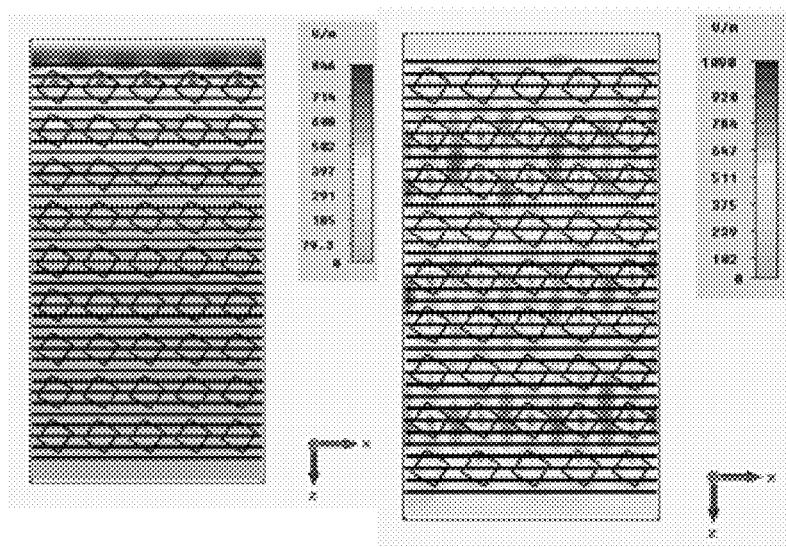

At least embodiments 11, the normalized operating frequency (a/λ) is 0.452. By adopting the three implementation and verifying with 3D structure parameters for nine layers of high-refractive-index first and second rotated-square pillars and thirty-seven layers of high-refractive-index dielectric veins, the result is illustrated in FIG. 15. It may be known from FIG. 15 that: the TEOS has good extinction effect.

Figure 16:
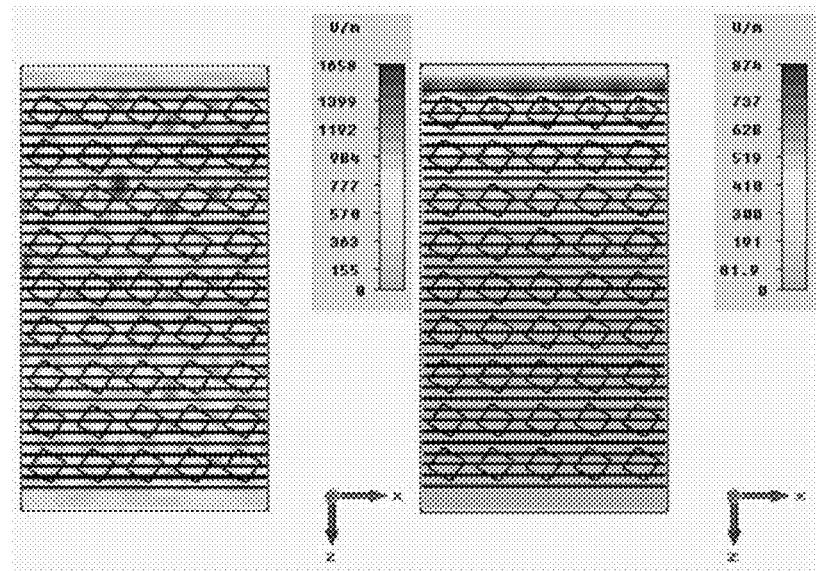

At least embodiments 12, the normalized operating frequency (a/λ) is 0.456. By adopting the three implementation and verifying with 3D structure parameters for nine layers of high-refractive-index first and second rotated-square pillars and thirty-seven layers of high-refractive-index dielectric veins, the result is illustrated in FIG. 16. It may be known from FIG. 16 that: the TEOS has good extinction effect.

Figure 17:
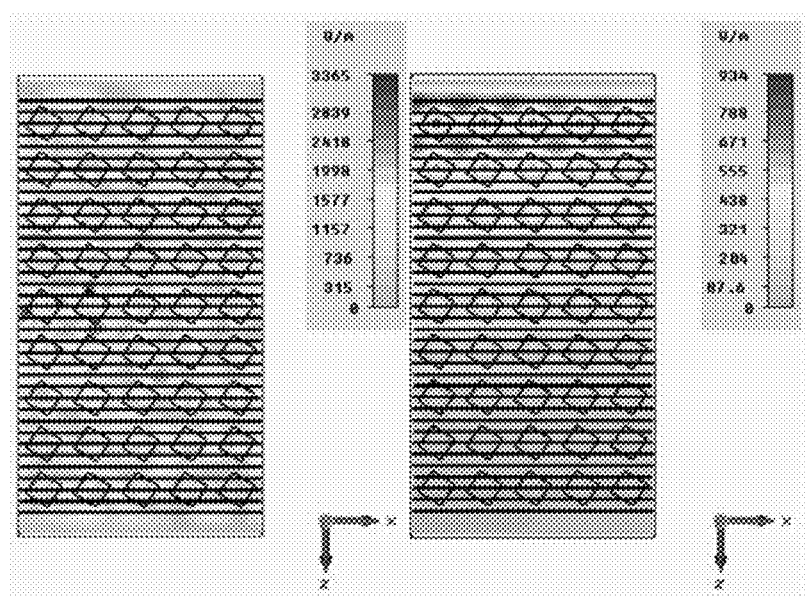

At least embodiments 13, the normalized operating frequency (a/λ) is 0.479. By adopting the three implementation and verifying with 3D structure parameters for nine layers of high-refractive-index first and second rotated-square pillars and thirty-seven layers of high-refractive-index dielectric veins, the result is illustrated in FIG. 17. It may be known from FIG. 17 that: the TEOS has good extinction effect.

While the disclosure has been described in terms of some specific embodiments, those skilled in the art will recognize that the disclosure may be practiced with modification within the spirit and scope of the claims.

What is claimed is:

1. A transverse electric optical switch (TEOS) with a high extinction ratio (EXR) based on slab photonic crystals (PhCs), comprising:
   an upper slab photonic crystal (PhC) and a lower slab PhC connected as a whole; said upper slab PhC is a first square-lattice slab PhC, a unit cell of said first square-lattice slab PhC comprises a high-refractive-index first rotated-square pillar, three first flat dielectric pillars and a background dielectric, said three first flat dielectric pillars are arranged horizontally, the three first flat dielectric pillars make the upper slab PhC connected as a whole, and each of said three first flat dielectric pillars comprises a high-refractive-index dielectric pipe and a low-refractive-index dielectric in a pipe, or 1 to 3 high-refractive-index flat films; said lower slab PhC is a second square-lattice slab PhC with a complete band gap; a unit cell of said second square-lattice slab PhC comprises a high-refractive-index second rotated-square pillar, three second flat dielectric pillars and a background dielectric; said three second flat dielectric pillars are arranged horizontally, said three second flat dielectric pillars make the lower slab PhC connected as a whole, and said three second flat dielectric pillars are high-refractive-index dielectric pillars; said background dielectric is a low-refractive-index dielectric; and an normalized operating frequency (a/λ) of said TEOS is 0.4057 to 0.406, 0.4267 to 0.4329, or 0.44 to 0.479, wherein a is one lattice constant of the first and second square-lattice slab PhCs, and λ is a wavelength of incident wave.

2. The TEOS with a high EXR based on slab PhCs according to claim 1, wherein a thickness of a pipe wall in each of said three first flat dielectric pillar in the unit cell of said first square-lattice slab PhC is 0-0.009a, wherein a is one lattice constant of the first square-lattice slab PhC; and a width of the low-refractive-index dielectric in the pipe is the difference between a width of a single one of said three first flat dielectric pillars and the thickness of the pipe wall.

3. The TEOS with a high EXR based on slab PhCs according to claim 1, wherein the single one of said three first flat dielectric pillars in the unit cell of said first square-lattice slab PhC is horizontally located at a center of said first rotated-square pillar, two remaining of said three first flat dielectric pillars are respectively parallel to the single one of said three first flat dielectric pillars located horizontally at the center of said first rotated-square pillar, and a distance between the two remaining of said three first flat dielectric pillars is 0.25a, wherein a is the lattice constant of the first square-lattice slab PhC.

4. The TEOS with a high EXR based on slab PhCs according to claim 1, wherein a side length of said high-refractive-index first rotated-square pillars of said first square-lattice slab PhC is 0.545a to 0.564a, wherein a is the lattice constant of the first square-lattice slab PhC, a rotated angle of the first square-lattice slab PhC is 0 to 90 degrees, and a width of each of said three first flat dielectric pillars in the unit cell of the first square-lattice slab PhC is 0.029a to 0.034a.

5. The TEOS with a high EXR based on slab PhCs according to claim 1, wherein a single one of said three second flat dielectric pillars in the unit cell of said second square-lattice slab PhC is horizontally located at a center of said second rotated-square pillar, two remaining said three second flat dielectric pillars are respectively parallel to the single one of said three second flat dielectric pillars located horizontally at the center of said second rotated-square pillar, and a distance between the two remaining of said three second flat dielectric pillars is 0.25a, wherein a is one lattice constant of the second square-lattice slab PhC.

6. The TEOS with a high EXR based on slab PhCs according to claim 1, wherein a side length of said high-refractive-index second rotated-square pillars of said second square-lattice slab PhC is 0.545a to 0.564a, wherein a is the lattice constant of the second square-lattice slab PhC, a rotated angle of the second square-lattice slab PhC is 0 to 90 degrees, and a width of each of said three second flat dielectric pillars in the unit cell of the second square-lattice slab PhC is 0.029a to 0.034a.

7. The TEOS with a high EXR based on slab PhCs according to claim 1, wherein said high-refractive-index dielectric is a different dielectric having a refractive index of more than 2.

8. The TEOS with a high EXR based on slab PhCs according to claim 1, wherein said high-refractive-index dielectric is silicon, gallium arsenide, or titanium dioxide.

9. The TEOS with a high EXR based on slab PhCs according to claim 1, wherein said low-refractive-index dielectric is a different dielectric having a refractive index of less than 1.5.

10. The TEOS with a high EXR based on slab PhCs according to claim 1, wherein said low-refractive-index dielectric is vacuum, air, cryolite, silica, organic foam, or olive oil.

11. The TEOS with a high EXR based on slab PhCs according to claim 1, wherein said TEOS has one state that said first square-lattice slab PhC is located in an optical channel (OCH), and said second square-lattice slab PhC is located outside the OCH, and another state that the second square-lattice slab PhC is located in the OCH and the first square-lattice slab PhC is located outside the OCH.

12. The TEOS with a high EXR based on slab PhCs according to claim 1, wherein said normalized operating frequency (a/λ) range of the TEOS is 0.4057 to 0.406, wherein a is the lattice constant of the first and second square-lattice slab PhCs, λ is a wavelength of incident wave, and the EXR is −14 dB to −15 dB; wherein said first square-lattice slab PhC is located in the optical channel (OCH) and said second square-lattice slab PhC is located outside the OCH, is an optically connected state; wherein the second square-lattice slab PhC is located in the OCH and the first square-lattice slab PhC is located outside the OCH, is an optically disconnected state.

13. The TEOS with a high EXR based on slab PhCs according to claim 12, wherein said normalized operating frequency (a/λ) range of the TEOS is 0.4057 to 0.406, wherein a is the lattice constant of the first and second square-lattice slab PhCs, λ is a wavelength of incident wave, and the EXR is −14 dB to −15 dB; wherein said first square-lattice slab PhC is located in the optical channel (OCH) and the second square-lattice slab PhC is located outside the OCH, is the optically connected state; wherein the second square-lattice slab PhC is located in the OCH and the first square-lattice slab PhC is located outside the OCH, is an optically disconnected state.

14. The TEOS with a high EXR based on slab PhCs according to claim 12, wherein said normalized operating frequency (a/λ) range of the TEOS is 0.4267 to 0.4329, wherein a is the lattice constant of the first and second square-lattice slab PhCs, λ is a wavelength of incident wave, and the EXR is −32 dB to −35 dB; wherein said second square-lattice slab PhC is located in the optical channel (OCH) and said first square-lattice slab PhC is located outside the OCH, is the optically connected state; wherein the first square-lattice slab PhC is located in the OCH and the second square-lattice slab PhC is located outside the OCH, is an optically disconnected state.

15. The TEOS with a high EXR based on slab PhCs according to claim 12, wherein said normalized operating frequency (a/λ) range of the TEOS is 0.44 to 0.479, wherein a is the lattice constant of the first and second square-lattice slab PhCs, λ is a wavelength of incident wave, and the EXR is −20 dB to −40 dB; wherein said second square-lattice slab PhC is located in the optical channel (OCH) and the first square-lattice slab PhC is located outside the OCH, is the optically connected state; wherein the first square-lattice slab PhC is located in the OCH and the second square-lattice slab PhC is located outside the OCH, is an optically disconnected state.

16. The TEOS with a high EXR based on slab PhCs according to claim 1, wherein said normalized operating frequency (a/λ) range of the TEOS is 0.4267 to 0.4329, wherein a is the lattice constant of the first and second square-lattice slab PhCs, λ is a wavelength of incident wave, and the EXR is −32 dB to −35 dB; wherein said second square-lattice slab PhC is located in the optical channel (OCH) and said first square-lattice slab PhC is located outside the OCH, is an optically connected state; wherein the first square-lattice slab PhC is located in the OCH and the second square-lattice slab PhC is located outside the OCH, is an optically disconnected state.

17. The TEOS with a high EXR based on slab PhCs according to claim 1, wherein said normalized operating frequency (a/λ) range of the TEOS is 0.44 to 0.479, wherein a is the lattice constant of the first and second square-lattice slab PhCs, λ is a wavelength of incident wave, and the EXR is −20 dB to −40 dB; wherein said second square-lattice slab PhC is located in the optical channel (OCH) and said first square-lattice slab PhC is located outside the OCH, is an optically connected state; wherein the first square-lattice slab PhC is located in the OCH and the second square-lattice slab PhC is located outside the OCH, is an optically disconnected state.

18. The TEOS with a high EXR based on slab PhCs according to claim 1, wherein positions of said first and second square-lattice slab PhCs in an optical channels (OCHs) are adjusted by external forces, including mechanical, electrical and magnetic forces.

* * * * *